United States Patent [19]

Shimoe et al.

[11] Patent Number: 5,198,762
[45] Date of Patent: Mar. 30, 1993

[54] MAGNETIC SENSOR HAVING SPACED MAGNETO-RESISTANCE ELEMENTS

[75] Inventors: Osamu Shimoe; Yukimasa Shonowaki, both of Kumagaya, Japan

[73] Assignee: Hitachi Metals, Ltd., Tokyo, Japan

[21] Appl. No.: 818,340

[22] Filed: Jan. 9, 1992

[30] Foreign Application Priority Data

Mar. 8, 1991 [JP] Japan .................................. 2-69278

[51] Int. Cl.$^5$ ........................... G01B 7/14; G11B 5/37
[52] U.S. Cl. .................. 324/207.21; 360/113; 338/32 R
[58] Field of Search ............... 324/207.21, 235, 252; 307/309; 338/32 R, 32 H; 360/113

[56] References Cited

U.S. PATENT DOCUMENTS

| | | | |
|---|---|---|---|
| 4,731,580 | 3/1988 | Indo | 324/252 X |
| 4,818,939 | 4/1989 | Takahashi et al. | 324/252 X |
| 5,036,276 | 7/1991 | Aizawa | 324/207.21 |
| 5,047,716 | 9/1991 | Katagiri | 324/207.21 |

FOREIGN PATENT DOCUMENTS

| | | |
|---|---|---|
| 54-41335 | 11/1973 | Japan . |
| 2-16973 | 12/1982 | Japan . |
| 63-302319 | 6/1987 | Japan . |

Primary Examiner—Gerard R. Strecker
Assistant Examiner—Warren S. Edmonds
Attorney, Agent, or Firm—Finnegan, Henderson, Farabow, Garrett & Dunner

[57] ABSTRACT

A magnetic sensor has first, second, third and fourth magneto-resistance effect elements disposed in a direction of a magnetizing pitch (1) of a magnetic recording medium serving to supply a magnetic signal, with first and second magneto-resistance effect elements disposed spacedly from each other at an interval corresponding to an electrical angle of $\theta$, the third and fourth magneto-resistance effect elements disposed spacedly from each other at an interval corresponding to an electrical angle of $(360° - \theta)$, and the intervals between the center line of the first and second magneto-resistance effect elements and between the line of the third and fourth magneto-resistance effect elements being set to $n\lambda$. The four magneto-resistance effect elements are connected to one another in series in the order of the first, second, fourth and third magneto-resistance effect elements with both ends of the serially-connected magneto-resistance effect elements being provided with a power source terminal, and an output terminal being provided at a conjunctive point of the second and fourth magneto-resistance effect elements. $\theta$ is set to a range of $30° \leq \theta \leq 90°$, based on $\lambda = 360$ to thereby enable an output wave form of the magnetic sensor to have a large or sharp gradient in the vicinity of a comparing level.

3 Claims, 8 Drawing Sheets

FIG. 2(a) MR1
FIG. 2(b) MR2
FIG. 2(c) MR1+MR2
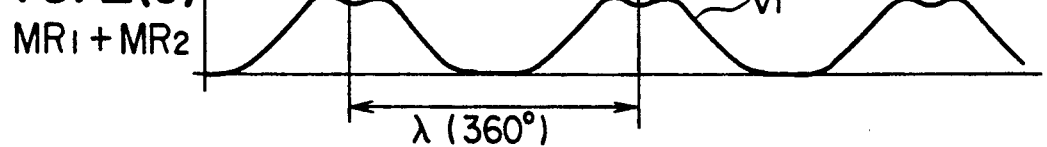
FIG. 2(d) MR3
FIG. 2(e) MR4
FIG. 2(f) MR3+MR4
FIG. 2(g) COMPOSITE OUTPUT
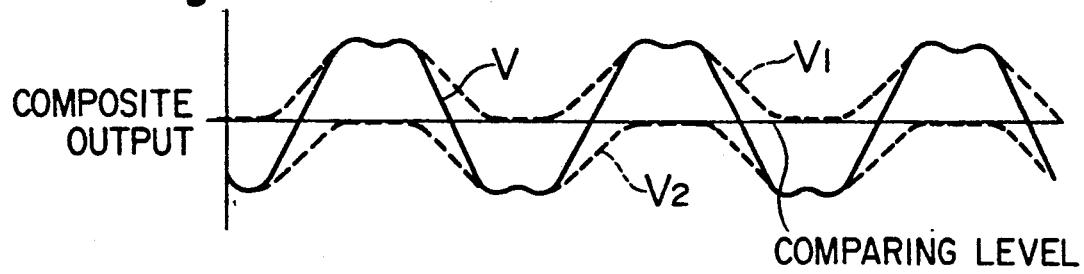

PHASE (DEG)

MAGNETIC SENSOR HAVING SPACED MAGNETO-RESISTANCE ELEMENTS

BACKGROUND OF THE INVENTION

1. Field of the Invention

This invention relates to a magnetic sensor for detecting a magnetic signal from a magnetic recording medium utilizing variation in the resistance value of a magneto-resistance effect element.

2. Description of the Related Art

In order to detect a magnetic signal from a magnetic recording medium, there has been utilized a magnetic sensor in which the magnetic signal is converted to an electrical signal by a magneto-resistance effect element and then the electrical signal is subjected to processing. This type of magnetic sensor has been disclosed in Japanese Unexamined Published (Laid-open) Patent Application No. Sho-54-41335. In this magnetic sensor, a pair of comb-shaped patterns are disposed so as to be perpendicular to a plane containing a magnetized pattern on a magnetic recording medium (hereinafter referred to as "magnetized pattern plane) which has been periodically magnetized at a pitch λ of magnetic poles (hereinafter referred to as "magnetizing pitch") in such a manner as to be positionally deviated by λ/2 on a plane in parallel with the direction of the magnetized pattern. However, in the manner as described above, when the magnetized pattern is so designed as to have an extremely minute magnetizing pitch λ in order to improve resolution, the intensity of a rotating magnetic field within a plane containing the comb-shaped patterns is weakened and thus the magneto-resistance effect element can not be magnetized to saturation. Therefore, this magnetic sensor has the shortcoming that a satisfactory detection can not be performed.

In order to overcome the above shortcoming, there has been further proposed a magnetic sensor in which two magneto-resistance effect elements are disposed in parallel to the magnetized pattern plane, but perpendicular to the magnetizing direction of the magnetized pattern, as disclosed in Japanese Examined Published Patent Application No. Hei-2-16973. In this case, in the same manner as shown in FIG. 6, N and S magnetic poles are alternately disposed on the magnetic recording medium at an interval of λ, and two striped magneto-resistance effect strip-shaped elements are disposed spacedly from each other at an interval of λ/2. The two magneto-resistance effect elements are connected to each other in series, and both ends of the serially-connected elements are provided with a power source terminal. An output of these magneto-resistance effect elements is obtained at an output terminal which is provided to a conjunctive point of the elements. When a current flows through the magneto-resistance effect elements while a magnetic field is applied to the elements in a direction perpendicular to a direction of the current, a resistance value between both terminals of the elements varies as shown in FIG. 5. As is apparent from FIG. 5, if an area which is not magnetically saturated (hereinafter referred to as "non-saturation area") is utilized in the resistance-variation rate as shown in FIG. 5, a substantially sinusoidal output can be obtained. This magnetic sensor utilizes the above characteristic. That is, since the intensity of a magnetic field which is applied to the magneto-resistance effect elements varies in a sinusoidal form by rotating the magnetic recording medium or the like, the output waveform of the resistance-variation which is obtained at the output terminal is also substantially sinusoidal. The thus obtained sinusoidal output is subjected to waveform processing to be converted to a rectangular waveform, whereby variation of the magnetic signal is detected.

This magnetic sensor is required to actuate the magneto-resistance effect element while the output of the element is not saturated and to output a sinusoidal-waveform signal at the output terminal. Therefore, the gap between the magnetic recording medium and the magnetic sensor is set to be relatively large, and thus the intensity of the magnetic field which is applied to the magnetic sensor is weakened. However, there are some cases where the gap between the magnetic recording medium and the magnetic sensor must be set to a short distance. In these cases, the intensity of the magnetic field which is applied to the magnetic sensor is unintentionally excessively strengthened, so that the magneto-resistance effect element is saturated and the output waveform thereof is extremely distorted. Therefore, in the waveform shaping operation of the sinusoidal waveform to the rectangular waveform, the gradient of the output sinusoidal voltage is moderated in the vicinity of a comparing level as indicated by a dotted circle of FIG. 7. For example, the output signal of rectangular waveform greatly varies merely when the comparing level is slightly fluctuated (within plus or minus 8 mV) due to the temperature drift of a processing circuit or the like, and thus it is difficult to detect a magnetized position.

The distance of the gap between the magnetic recording medium and the magnetic sensor is mainly dependent on design accuracy of the magnetic recording medium, but is also dependent on unavoidable factors such as eccentricity of the axis of the magnetic recording medium and so on. Therefore, there has been required a magnetic sensor for obtaining an output signal having a large or sharp gradient in the vicinity of the comparing level.

In order to satisfy the above requirement, a magnetic sensor as disclosed in Japanese Unexamined Published Patent Application No. Sho-63-302319 has been proposed. This magnetic sensor comprises two pairs of patterns confronting a magnetic recording medium having a magnetizing pitch of λ, one of which patterns includes two magneto-resistance effect elements disposed at an interval of iλ and the other of which includes two magneto-resistance effect elements disposed at an interval of $(i+j)\lambda$, where i represents zero or an integer and $0<j<1$. In this magnetic sensor, an output waveform obtained through add and subtract operations between outputs of the above pairs has a large gradient in the vicinity of the comparing level.

For example, as shown in FIG. 8, N and S magnetic poles are alternately disposed on a magnetic recording medium 21 at an interval of λ, and a pair of magneto-resistance effect elements 22 and 23 which are disposed spacedly at an interval of 0.2λ in such a manner as to confront the magnetic recording medium, are connected to each other in series. Both ends of the elements are supplied with a voltage from a power source, and an output having a waveform as indicated by a character A of FIG. 9 is obtained at a connection point A of the magneto-resistance effect elements.

Likewise, a second pair of magneto-resistance effect elements 25 and 26 which are disposed spacedly at an interval of 0.8λ in such a manner as to confront the magnetic recording medium, are connected to each other in series, and both ends of the connected elements are supplied with a voltage from the power source, to thereby obtain an output waveform as indicated by a character B of FIG. 9 at a conjunctive point B. In this case, in order to provide both outputs of the magneto-resistance effect elements with a suitable relative phase-difference, both pairs are positionally deviated from each other by 0.7λ. A final output having a waveform as shown in FIG. 10 is obtained by adding both of the outputs A and B of the pairs.

The magnetic sensor thus constructed is superior in that the output of the magnetic sensor has a larger or sharper waveform in the vicinity of the comparing level, in comparison with a conventional magnetic sensor in which two pairs of magneto-resistance effect elements, one pair comprising two magneto-resistance, effect elements disposed at the interval of λ, are spacedly disposed at an interval of $(N+1/2)λ$. However, in the magnetic sensor using two pairs of magneto-resistance effect elements as described above, an alternating arrangement is required for current terminals, for example, in such a manner that Vcc, GND, Vcc and GND are alternately disposed as shown in FIG. 8. The current terminals are not integrally or commonly formed on substrate, so that a wire pattern in which four current terminals are individually electrically drawn out of the respective magneto-resistance effect elements is required and thus there is a probability that each element would be required to be large in size. Further, there frequently occur unfavorable results in manufacturing process and practical use because connection is required for the magneto-resistance effect elements. Still further, since the magnetic sensor adopting the above manner does not function as a magnetic sensor unless an adder for adding the outputs 1 and 2 of the two pairs of magneto-resistance effect elements is included in the device, high cost and complicated construction are required to apply the above magnetic sensor to a field in which plural magnetic sensors must be used.

SUMMARY OF THE INVENTION

An object of this invention is to provide a magnetic sensor capable of overcoming the above disadvantages of conventional magnetic sensors.

In order to attain the above object, the magnetic sensor according this invention includes first, second, third and fourth magneto-resistance effect elements which are disposed in this order in a direction of a magnetizing pitch (λ) of a magnetic recording medium serving to supply a magnetic signal, wherein the first and second magneto-resistance effect elements are disposed spacedly from each other at an interval corresponding to an electrical angle of $θ$, the third and fourth magneto-resistance effect elements are disposed spacedly from each other at an interval corresponding to an electrical angle of $(360°-θ)$, where $360°$ corresponds to the electrical angle of the pitch interval (λ) an interval between a center line of the first and second magneto-resistance effect elements and a center line of the third and fourth magneto-resistance effect elements is set to nλ. The four magneto-resistance effect elements are connected to one another in series in the order of the first, second, fourth and third magneto-resistance effect elements. Both ends of the serially-connected magneto-resistance effect elements are provided with a power source terminal, and an output terminal is provided at a connection point of the second and fourth magneto-resistance effect elements. $θ$ is set to a range of $30°≦θ≦90°$.

Further, an assembly of K magnetic sensors as described above are disposed spacedly from one another at intervals of $(1+m/2+1/(2K))λ$ (1, m: 0 or an integer, K: an integer, λ: magnetizing pitch), and outputs of the magnetic sensors are synthesized into a composite output.

BRIEF DESCRIPTION OF THE DRAWINGS

FIGS. 2(a)–2(g) are a waveform diagram for an output waveform of each magneto-resistance effect element, a composite waveform and a composite output;

DETAILED DESCRIPTION OF THE PREFERRED EMBODIMENTS

Preferred embodiments of this invention will be described in more detail with reference to the accompanying drawings.

Figure 1:
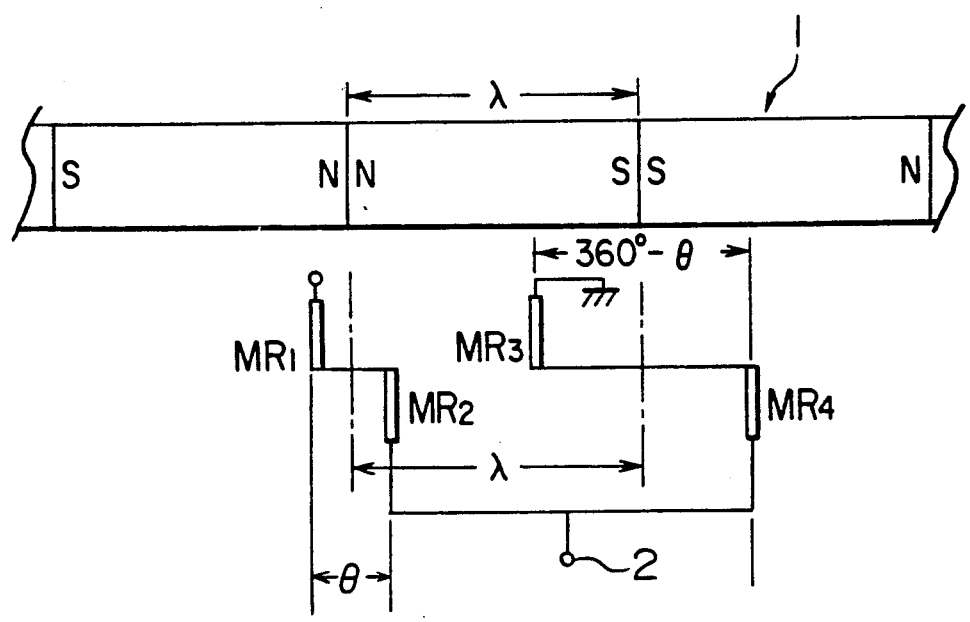
FIG. 1 is an explanatory diagram for a first embodiment of a magnetic sensor.

FIG. 1 is an schematic diagram for the construction of a magnetic sensor according to this invention.

A magnetic recording medium 1 has a magnetized pattern in which different magnetic poles (S and N) are alternately periodically arranged at a magnetizing pitch of λ, and a magnetic sensor is disposed so as to confront a magnetized portion through a gap to detect variation of a magnetic signal from the magnetized portion.

The magnetic sensor comprises first, second, third and fourth magneto-resistance effect elements MR1, MR2, MR3 and MR4 which are disposed in this order in a direction of the magnetizing pitch. The first and second magneto-resistance effect elements MR1 and MR2 are disposed spacedly from each other at an interval corresponding to an electrical angle of $θ$, and the third and fourth magneto-resistance effect elements MR3 and MR4 are disposed spacedly from each other at an interval corresponding to an electrical angle of $360°-θ$. In addition, these four magneto-resistance effect elements are disposed such that an interval between a center line of the first and second magneto-resistance effect elements and a center line of the third and fourth magneto-resistance effect elements is equal to $nθ$ (n: an integer, in this case to $θ$). The four magneto-resistance effect elements MR1, MR2, MR3 and MR4 are connected to one another in series in the order of the first, second, fourth and third magneto-resistance effect elements. Both unconnected ends of these serially connected magneto-resistance effect elements serve as a terminal for a power source (power source terminal), and an output terminal 2 for the serial-connected elements is provided at a conjunctive portion of the second and fourth magneto-resistance effect elements MR2 and MR4. The output terminal 2 outputs a sum value between a composite output in resistance variation of the first and second magneto-resistance effect elements MR1 and MR2 and another composite output in resistance variation of the third and fourth magneto-resistance effect elements MR3 and MR4.

The magneto-resistance effect elements MR1 and MR2 develop voltage-variations as shown in FIGS. 2(a) and 2(b) respectively because the voltage-variation of the magneto-resistance effect element MR2 is delayed by $\theta$ with respect to the voltage-variation of the magneto-resistance effect element MR1, and a composite output voltage V1 of the magneto-resistance effect elements MR1 and MR2 has a waveform as shown in FIG. 2(c).

On the other hand, the magneto-resistance effect elements MR3 and MR4 develop voltage-variations as shown in FIGS. 2(d) and 2(e) which are expected from the positional relationship thereof as shown in FIG. 1. That is, the voltage-variation of the magneto-resistance effect element MR3 has an output waveform whose phase proceeds by $(360° - \theta)/2$ from a phase point which is further delayed by $\lambda$ (corresponding to an electrical angle of $2\pi = 360°$) from a midpoint of a phase difference $\theta$ between the output wave forms of the magneto-resistance effect elements MR1 and MR2 (in other words, a phase point delayed from the output of MR1 by $\theta/2$), while the voltage-variation of the magneto-resistance effect element MR4 has an output waveform whose phase is delayed from the phase point by $(360° - \theta)/2$. The composite output voltage V2 of the output waveforms becomes a waveform as shown in FIG. 2(f). Therefore, the composite output V of the output voltages V1 and V2 as described above has a waveform as indicated by a solid line of FIG. 2(g). This waveform of the composite output V has a extremely large or sharp gradient in the vicinity of the comparing level, so that a rectangular waveform which is obtained from the obtained output waveform scarcely varies even when the comparing level drifts slightly, and thus the detection accuracy is improved.

EXAMPLE 1

Figure 3:
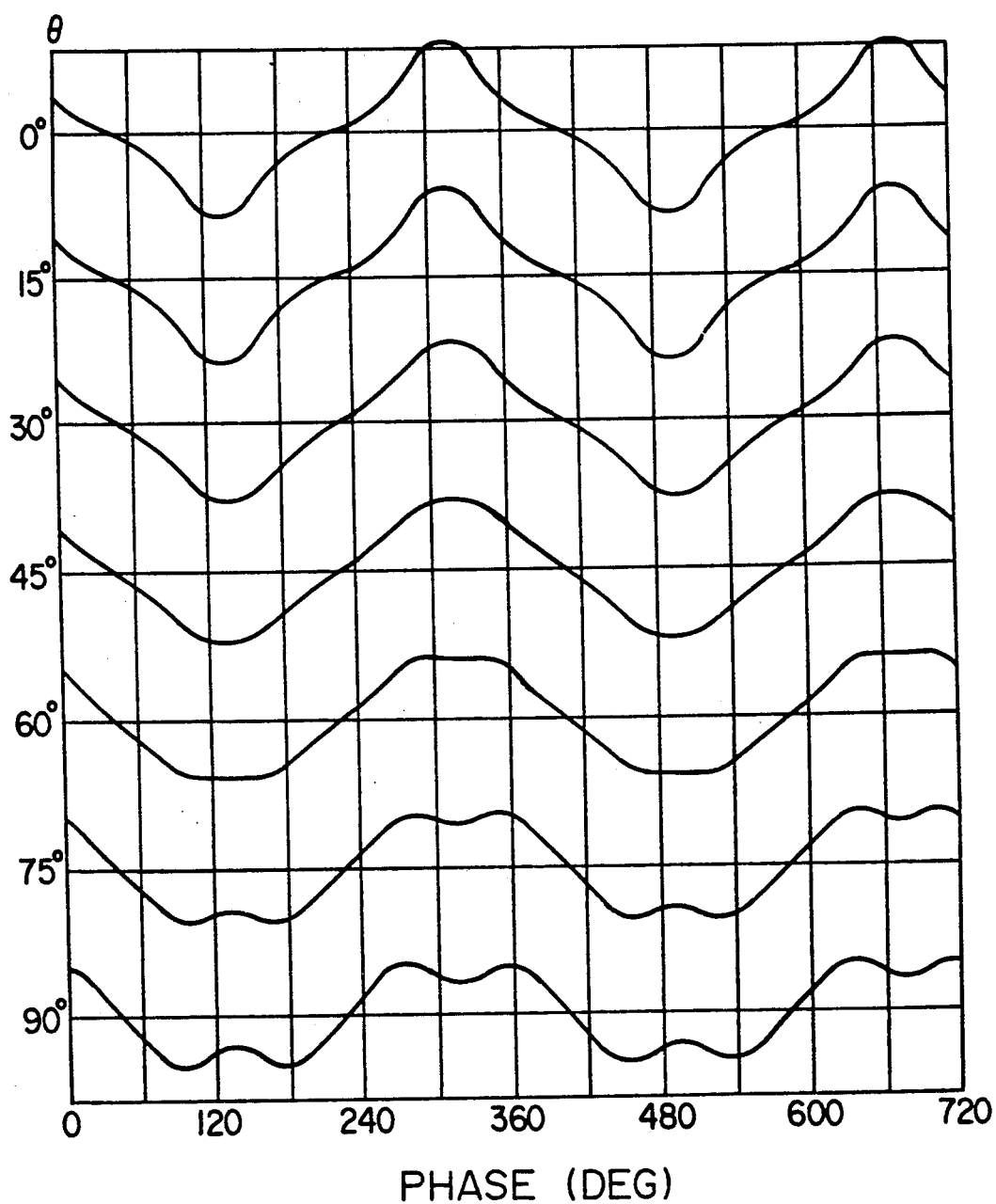
FIG. 3 is a diagram for an output waveform in a case where the magnetic sensor of the first embodiment is used.

FIG. 3 shows an output waveform of the magnetic sensor as shown in FIG. 1, which was obtained by changing $\theta$ from 0° to 90° every degree interval of 15°. As is apparent from FIG. 3, the gradient of the output waveform becomes larger in the vicinity of the comparing level as $\theta$ is increased. By setting $\theta$ above 30° and preferably above 45° in practical use, the magnetic sensor is not influenced by fluctuation of the output and noises in the waveform shaping operation to the rectangular waveform, and variation in ratio of ON and OFF of an output signal and position variation are small, so that the detection accuracy is improved. On the other hand, the gradient of the output waveform in the vicinity of the comparing level is larger, but an output value is reduced as $\theta$ approaches 90°, and therefore it is clear that it is preferable to set $\theta$ below 90°.

As described above, in this invention, the improvement of the output waveform is enabled without sacrificing amplitude of the output by satisfying the following condition: $30° \leq \theta \leq 90°$. Further, the magnetic sensor of this invention comprises four magneto-resistance effect elements, but has the advantage that it may be applied without a special processing circuit to a field in which plural magnetic sensors are suitably combined with one another because the magnetic sensor is substantially a three-terminal element.

EXAMPLE 2

Figure 4:
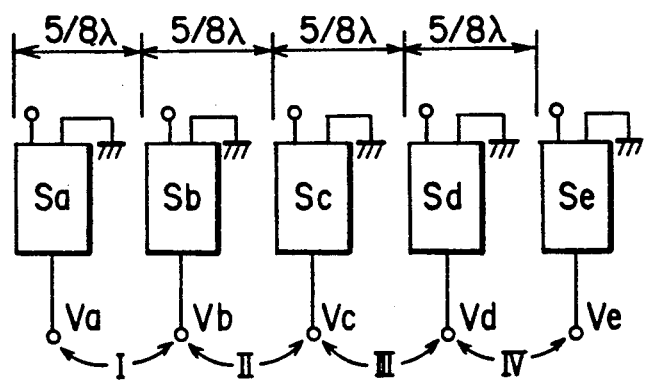
FIGS. 4a to 4e are explanatory diagrams and waveform diagrams for a magnetic sensor of a second embodiment.
Figure 4:
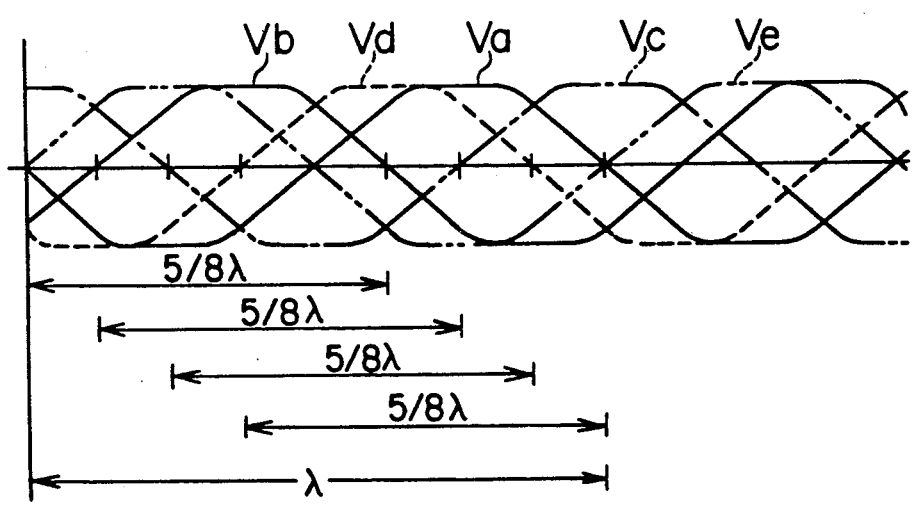

Another embodiment of the magnetic sensor of this invention will be next described with reference to FIG. 4.

In this embodiment, five magnetic sensors of the first embodiment are used in combination to obtain high resolution. In FIG. 4, each of magnetic sensors Sa to Se comprises four magneto-resistance effect elements MR1 to MR4 used in the first embodiment as described above. In this case, $\theta$ is set to 60°. The magnetic sensors Sa to Se are disposed spacedly from one another at an interval of $\frac{5}{8}\lambda$ in the direction of the magnetizing pitch ($\lambda$) of the magnetic recording medium 1. Of the outputs Va, Vb, Vc, Vd and Ve of the magnetic sensors Sa, Sb, Sc, Sd and Se, each pair of the outputs of the neighboring magnetic sensors are connected to a synthesizer (not shown) to obtain add-and-subtract outputs I, II, III, IV and V thereof. A spacing interval between the neighboring magnetic sensors, for example, Sa and Sb may be set to $(n + \frac{5}{8})\lambda$ (n: an integer) because phase is not varied.

A high-resolution increment signal is intensively required in a rotating magnetic sensor. However, in a case where the resolution is improved with the same drum diameter, the magnetizing pitch $\lambda$, and thus the output magnetic flux from the drum surface is reduced. As a result, a gap between the sensor and the drum is narrowed, and there occurs a disadvantage that the assembling process is difficult. However, according to this invention, high resolution is obtained without varying the gap dimension between the sensor and the drum (without shortening the magnetizing pitch).

As described above, in this embodiment, the respective magnetic sensors are disposed at the interval of $(\frac{5}{8})\lambda$ for the magnetizing pitch $\lambda$ of the drum. Therefore, the output signals Va, Vb, Vc, Vd and Ve of the respective magnetic sensors are delayed by $(\frac{5}{8})\lambda$, respectively, as shown in FIG. 4(b).

As is apparent from the first embodiment, the output of the magnetic sensor according to this invention contains higher harmonic waves. However, in order to simplify the description, the principle of a process of obtaining the above output signals will be described considering only a fundamental wave.

For example, assuming that $Va = V \sin \theta$, since a phase difference between the respective output signals is $(\frac{5}{8})\lambda$, $$I = Va - Vb = V\sin\theta - V\sin(\theta - 5 \cdot 2\pi/8)$$
$$= 2V\sin 5\pi/8 \cdot \cos(\theta - 5\pi/8)$$
$$= 2V\sin 5\pi/8 \cdot \sin(\theta - \pi/8)$$

Likewise, $$II = Vc - Vb = 2V \sin 5\pi/8 \cdot \sin(\theta - 3\pi/8)$$

$$III = Vc - Vd = 2V \sin 5\pi/8 \cdot \sin(\theta - 5\pi/8)$$

$$IV = Ve - Vd = 2V \sin 5\pi/8 \cdot \sin(\theta - 7\pi/8)$$

Figure 4C:
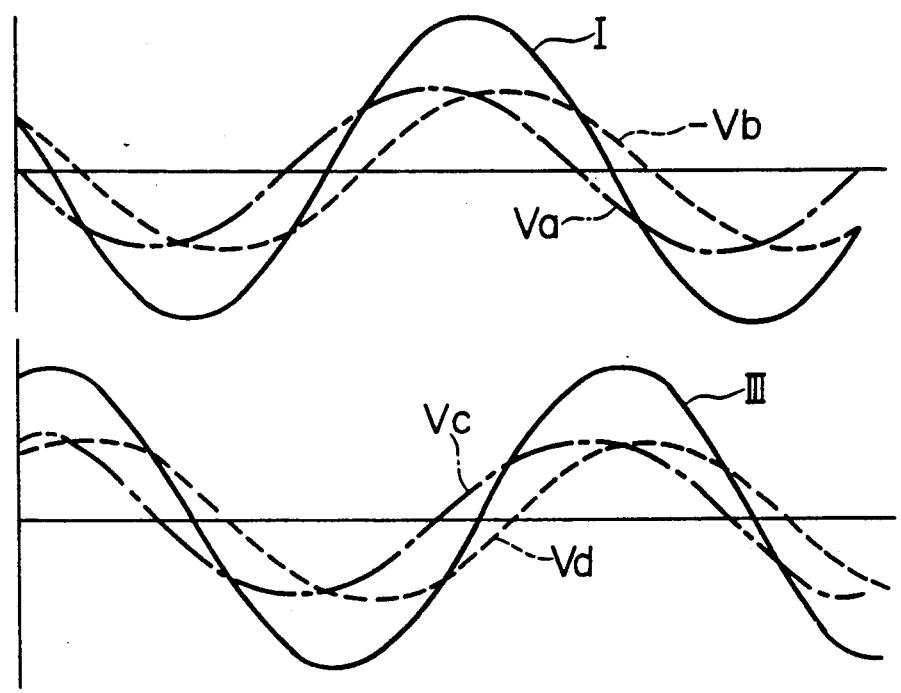
Figure 4D:
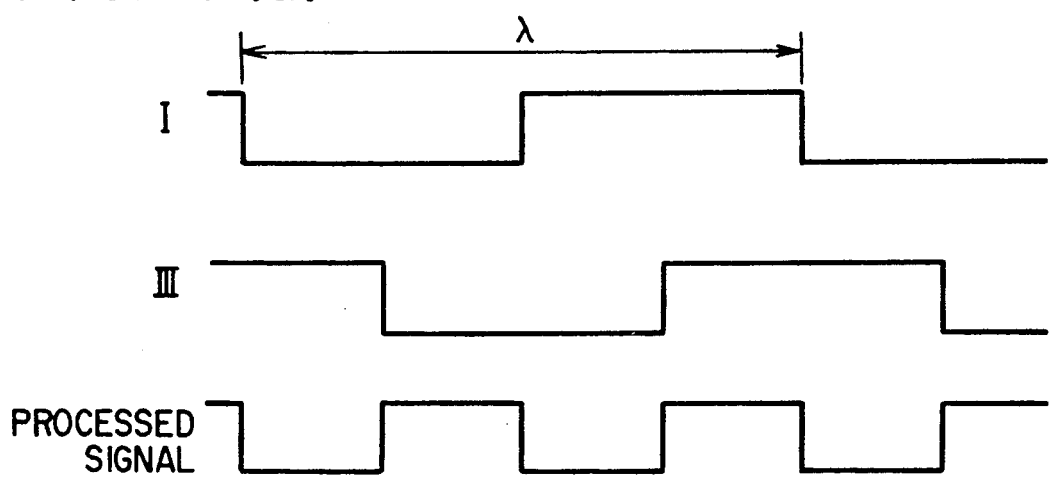
Figure 4:
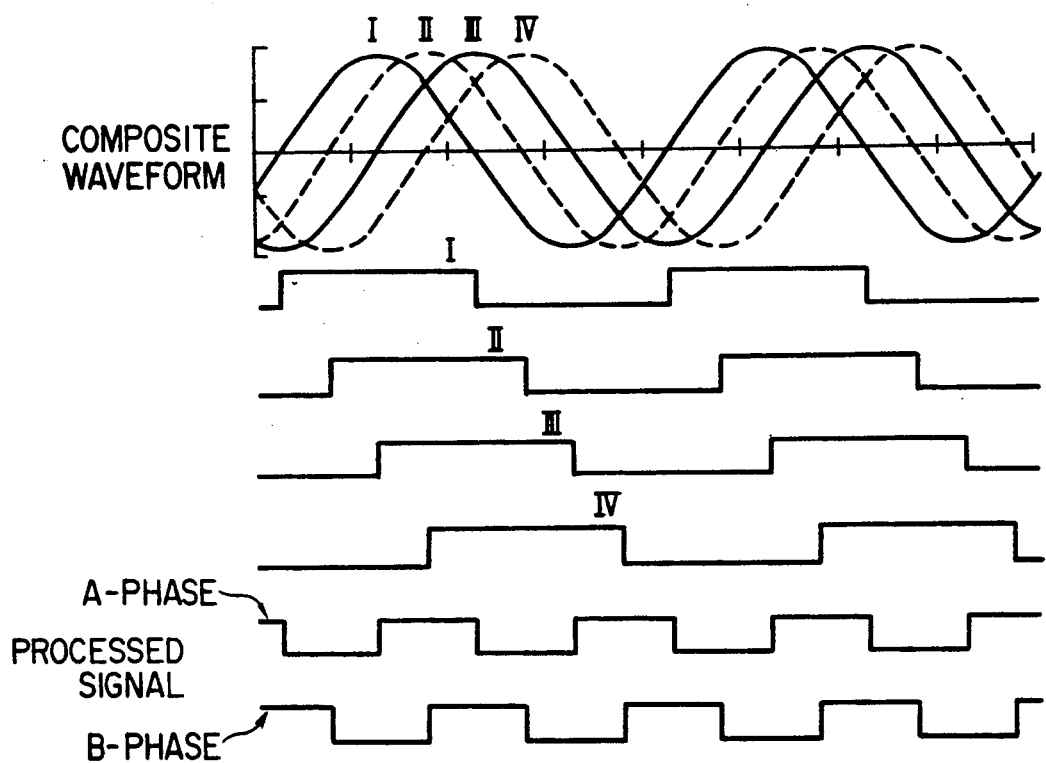
Figure 5:
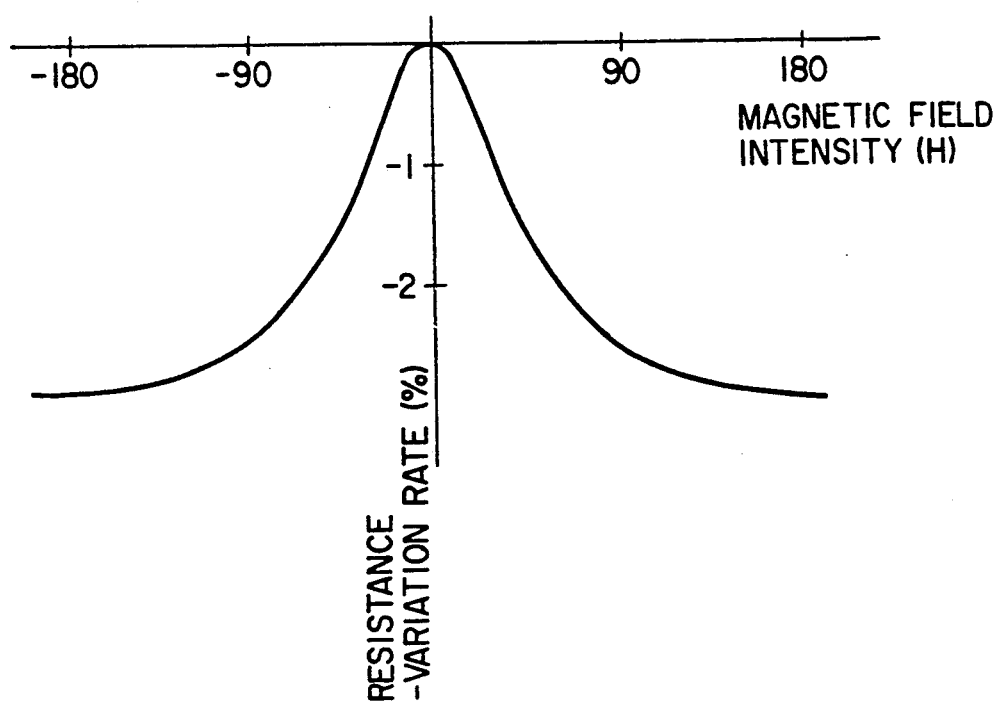
FIG. 5 is a characteristic diagram for a conventional magneto-resistance effect element.
Figure 6:
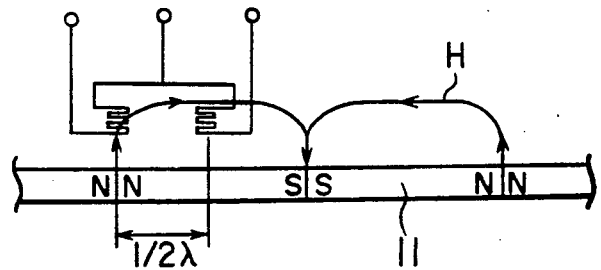
FIG. 6 is an explanatory diagram for a magnetic sensor using two conventional magneto-resistance effect elements.
Figure 7:
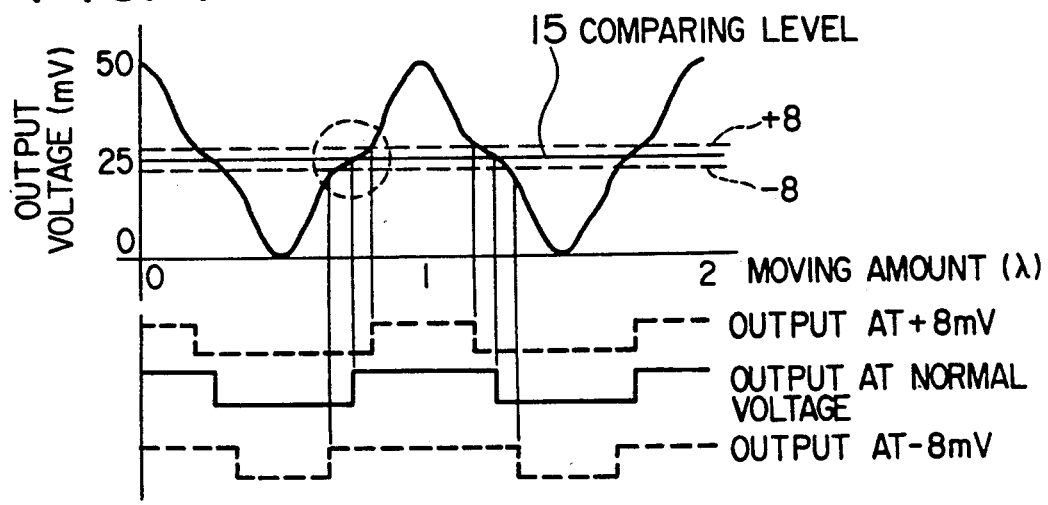
FIG. 7 is a diagram for an output waveform of a conventional magnetic sensor.
Figure 8:
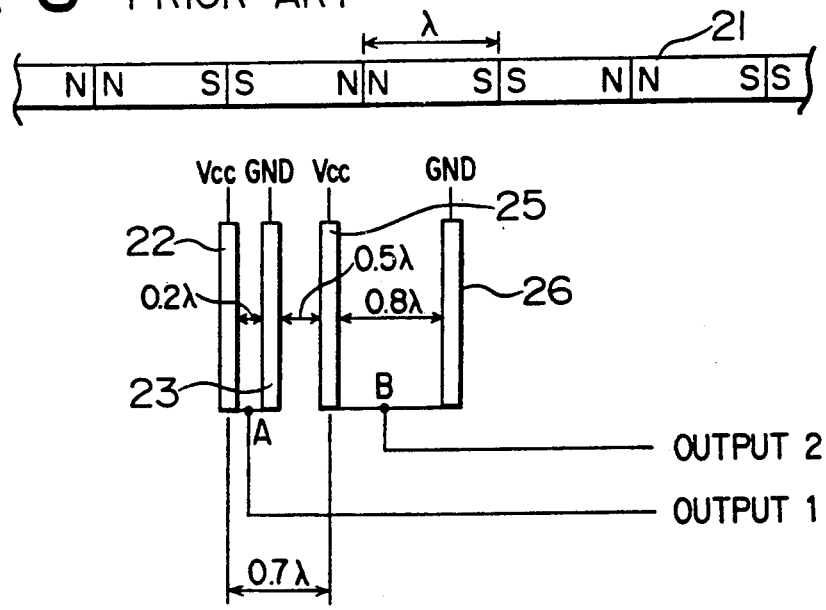
FIG. 8 is an explanatory diagram for a magnetic sensor using four conventional magneto-resistance effect elements.
Figure 9:
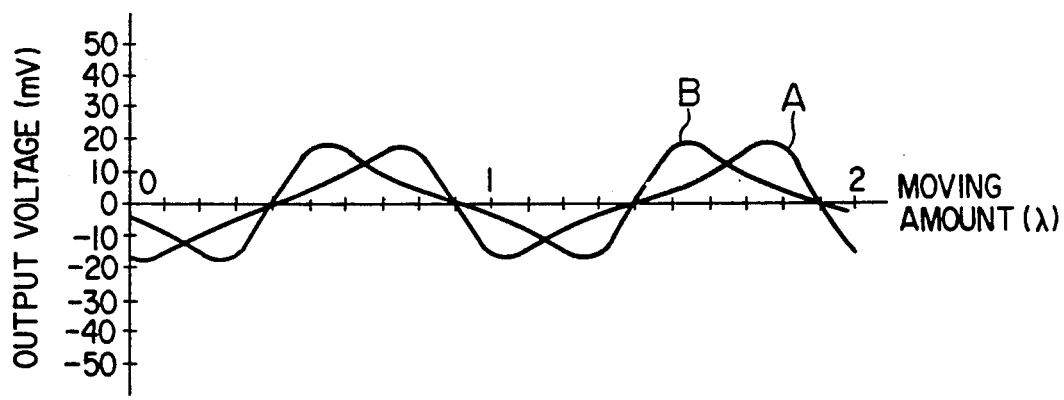
FIG. 9 is a waveform diagram for a composite output of two magneto-resistance effect elements of a conventional magnetic sensor.
Figure 10:
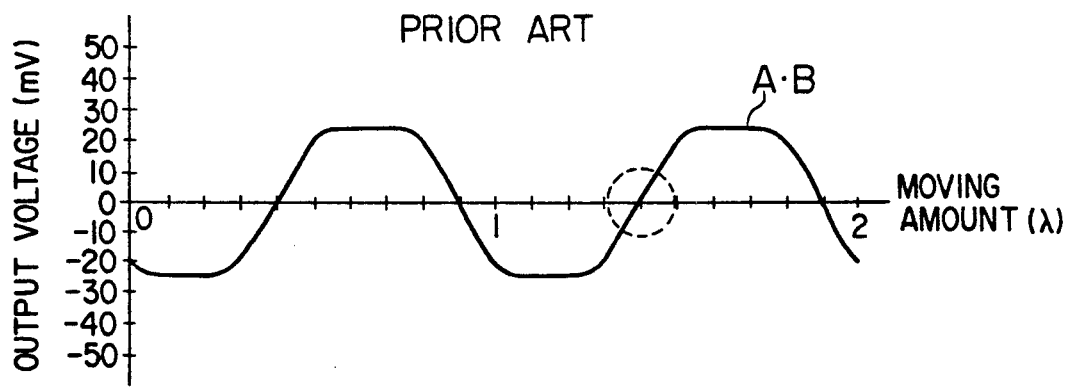
FIG. 10 is a waveform diagram for a composite output of four magneto-resistance effect elements of a conventional magnetic sensor.

Therefore, four waveforms having a phase difference of 45° therebetween are obtained through the synthesizing process. FIG. 4(c) shows the signals I (=Va−Vb) and III (=Vc−Vd) which are obtained by synthesizing the output waveforms as shown in FIG. 4(b), and FIG. 4(d) shows rectangular waveforms which are obtained by subjecting the signals I and III to waveform shaping and then to an exclusive OR processing. As is apparent from FIG. 4, in a manner of subjecting the original waves and composite waves to the waveform shaping and the exclusive OR processing after other processings for the waves, a final composite signal (hereinafter referred to as "processed signal") having a period of ($\frac{1}{4}$)λ can be obtained.

The processed signal waveforms having a phase difference of 45° (of the original wave) are synthetically obtained as A-phase and B-phase signals from I and III and from II and IV, respectively, and the A-phase and B-phase signals have a half period of the original waves and a phase difference of 90°.

The waveforms of the signals I to IV and a phase relationship after processed are shown in FIG. 4(e). According to this invention, a high-resolution magnetic sensor-assembly can be easily implemented by merely disposing plural unit magnetic sensor patterns at a predetermined pitch.

According to the magnetic sensor of this invention as described above, since four magneto-resistance effect elements are disposed with a predetermined arrangement while connected to one another in series and an interval of the respective magneto-resistance effect elements is set to a suitable value, an output waveform has a large or sharp gradient in the vicinity of the comparing level and has a large output value (amplitude). As a result, the detection accuracy of the magnetic sensor is improved. Further, four magneto-resistance effect elements are used, but only two terminals are used as a power source terminal, and this is advantageous for the manufacturing process and practical use of the sensor. Still further, in a case where plural magnetic sensors each comprising four magneto-resistance effect elements as described above are disposed spacedly from each other at a predetermined interval and a composite output between the respective magnetic sensors is obtained, high resolution is obtainable and thus the detection accuracy can be improved.

What is claimed is:

1. A magnetic sensor for detecting a magnetic signal from a magnetic recording medium magnetized periodically in a magnetizing direction at a magnetizing pitch of λ on the basis of variation in resistance value of magneto-resistance effect elements, comprising:

first, second, third and fourth magneto-resistance effect elements disposed in this order in the magnetizing direction of the magnetizing pitch λ of the magnetic recording medium, wherein said first and second magneto-resistance effect elements are disposed spacedly from each other at an interval corresponding to an electrical angle of θ, based on λ=360°, while said third and fourth magneto-resistance effect elements are disposed spacedly from each other at an interval corresponding to an electrical angle of (360°−θ), and wherein the interval between a center line of said first and second magneto-resistance effect elements and a center line of said third and fourth magneto-resistance effect elements is set to nλ (n: an integer), said four magneto-resistance effect elements being connected to one another in series in the order of said first, second, fourth and third magneto-resistance effect elements and θ being set to a range of 30°≦θ≦90°, and wherein a power source terminal is provided at each end of said serially-connected magneto-resistance effect elements and an output terminal is provided at a connection point of said second and fourth magneto-resistance effect elements.

2. A magnetic sensor assembly comprising a plurality K of magnetic sensors as claimed in claim 1, wherein said K magnetic sensors are disposed spacedly from one another at an interval of (1+m/2+1/(2K)) λ (1, m: 0 or an integer, K: an integer, λ: magnetizing pitch), and wherein the individual outputs of said K magnetic sensors are synthesized into a composite output.

3. The magnetic sensor as in claim 1, wherein θ is in range 45°<θ<90°.

* * * * *